United States Patent
Shimura

[19]

[11] Patent Number: 5,809,517
[45] Date of Patent: Sep. 15, 1998

[54] DETACHABLE MEMORY APPARATUS CAPABLE OF VARYING NUMBER OF WAIT STATES FOR ACCESS BASED ON STORED TIMING INFORMATION

[75] Inventor: Akihiro Shimura, Tokyo, Japan

[73] Assignee: Canon Kabushiki Kaisha, Tokyo, Japan

[21] Appl. No.: 487,698

[22] Filed: Jun. 7, 1995

Related U.S. Application Data

[63] Continuation of Ser. No. 48,939, Apr. 20, 1993, abandoned, which is a continuation of Ser. No. 485,474, Feb. 27, 1990, abandoned.

[30] Foreign Application Priority Data

Mar. 8, 1989 [JP] Japan ....................................... 1-57303

[51] Int. Cl.⁶ .................................................. G06F 13/00
[52] U.S. Cl. .......................................... 711/115; 711/167
[58] Field of Search ........................... 395/425; 711/115, 711/167

[56] References Cited

U.S. PATENT DOCUMENTS

| | | | |
|---|---|---|---|
| 4,217,637 | 8/1980 | Faulkner et al. ......................... | 364/200 |
| 4,608,689 | 8/1986 | Sato ........................................ | 395/200 |
| 4,636,939 | 1/1987 | Fildes ...................................... | 364/200 |
| 4,665,495 | 5/1987 | Thaden .................................... | 364/900 |
| 4,680,701 | 7/1987 | Cochran .................................. | 295/375 |
| 4,691,289 | 9/1987 | Thaden .................................... | 364/200 |
| 4,737,908 | 4/1988 | Shinohara et al. ...................... | 364/200 |
| 4,872,138 | 10/1989 | Ciacci .................................... | 364/200 |
| 4,954,951 | 9/1990 | Hyatt ....................................... | 364/200 |
| 4,956,804 | 9/1990 | Matsumoto ............................. | 395/425 |
| 5,038,282 | 8/1991 | Gilbert .................................... | 364/200 |
| 5,113,518 | 5/1992 | Durst, Jr. et al. ....................... | 395/550 |
| 5,278,974 | 1/1994 | Lemmon et al. ........................ | 395/425 |

OTHER PUBLICATIONS

"Peel Device Architectures Enchance Microprocessor System Logic Applications," WESCON/87 Conference Record, Jigour et al., vol. 31, 1987, pp. 18/4 (1–8).

"Matching Processor Timing Sequence To Different Memories," IBM Technical Disclosure Bulletin, Beaver et al., Vo. 24, No. 12, May 1982, pp. 6256–6257.

Primary Examiner—David L. Robertson
Attorney, Agent, or Firm—Fitzpatrick, Cella, Harper & Scinto

[57] ABSTRACT

An information processing apparatus capable of varying the number of wait states for access to the memory according to the access time. An interchangeable external memory unit stores data on the number of wait states for access, and the apparatus reads the data and accordingly controls the number of wait states, thus realizing an optimum process speed.

15 Claims, 1 Drawing Sheet

DETACHABLE MEMORY APPARATUS CAPABLE OF VARYING NUMBER OF WAIT STATES FOR ACCESS BASED ON STORED TIMING INFORMATION

This application is a continuation of application Ser. No. 08/048,939, filed Apr. 20, 1993, now abandoned, which was a continuation of application Ser. No. 07/485,474, filed Feb. 27, 1990, now abandoned.

BACKGROUND OF THE INVENTION

1. Field of the Invention

The present invention relates to an information processing apparatus with an interchangeable external memory such as a read only memory ("ROM") card.

2. Related Background Art

With conventional information processing apparatus, the number of wait states of the central processing unit ("CPU"), which accesses an interchangeable external memory, is either fixed by hardware incorporated in the apparatus or controlled by hardware provided in the external memory.

However, such conventional structure has been associated with the following drawbacks:

(1) When the number of wait states for access to the external memory by the CPU is fixed by hardware incorporated in the apparatus, increased processing speed cannot be obtained even with an external memory having higher access speed (which is capable of functioning with a fewer number of wait states) because the number of wait states is fixed in the hardware of the apparatus.

(2) When the number of wait states for access to the external memory by the CPU is controlled by hardware of the external memory, each external memory has to be provided with hardware for controlling the number of wait states.

Also, a signal line is required for controlling the number of wait states when interfacing with the external memory.

SUMMARY OF THE INVENTION

In consideration of the foregoing, an object of the present invention is to provide an apparatus capable of varying the number of wait states for access to an external memory by the CPU.

Another object of the present invention is to provide an apparatus capable of effecting a process depending on the access time of the memory.

The foregoing objects can be attained, according to an embodiment of the present invention, by an information processing apparatus comprising:

an interchangeable external memory for storing data therein and holding information on the number of wait states for access;

a processor for accessing said external memory and processing the data stored therein;

a reader for reading, from the external memory, the information on the number of wait states for access;

a setting device for setting the number of wait states for accessing the external memory by the processor, based on the information on the number of wait states for access read by the reader; and a controller for controlling the access by the processor, according to the number of wait states set by the setting means.

In another embodiment of the present invention, the information processing apparatus comprises:

a plurality of interchangeable external memories for storing data, each holding information on the number of wait states for access;

a processor for accessing the plurality of external memories and processing the stored information therein;

a reader for reading the information on the number of wait states for access, from each of the plurality of external memories;

a setting device for setting the number of wait states for access to the external memories by the processor, based on the plurality of information on the number of wait states for access, read by the reader; and a controller for controlling the access by the processor, according to the number of wait states set by the setting device.

In still another embodiment of the present invention, the information processing apparatus comprises:

an interchangeable external memory for storing data therein and holding a number of wait states for access;

a processor for accessing the external memory and processing the data stored therein;

a reader for reading, from the external memory, the number of wait states for access;

a setting device for setting the number of wait states for access to the external memory by the processor at the value read by the reader; and a controller for controlling the access by the processor, according to the number of wait states set by the setting device.

DESCRIPTION OF THE PREFERRED EMBODIMENTS

Figure 1:
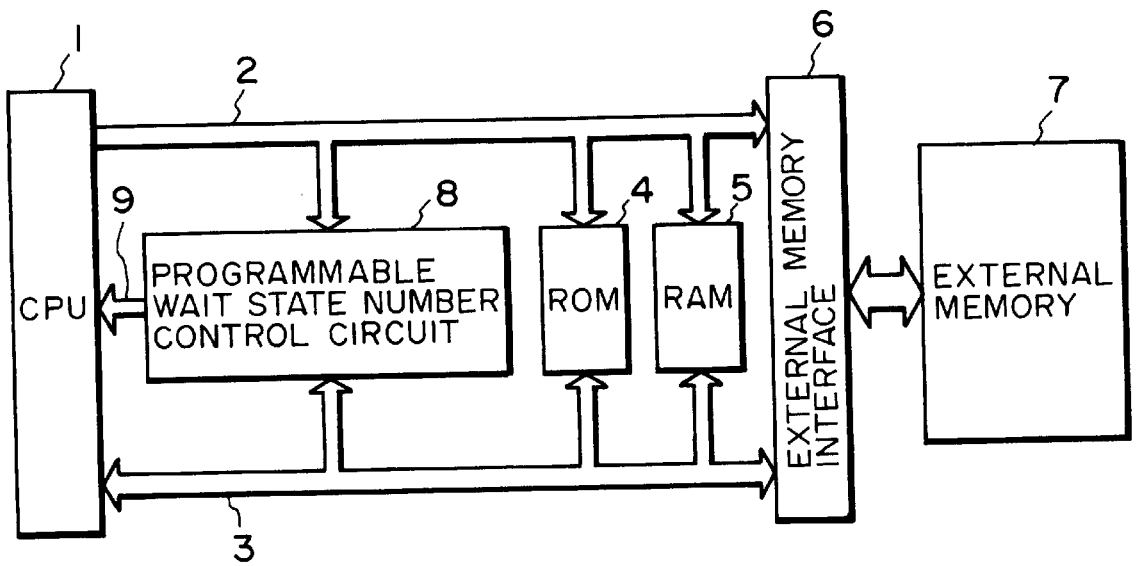
FIG. 1 is a block diagram of an information processing apparatus in accordance with an embodiment of the present invention.

Now the present invention will be clarified in more detail by an embodiment as shown in FIG. 1.

FIG. 1 shows a CPU 1 for controlling the entire apparatus; an address bus 2 for transferring an address signal indicating the object of control of the CPU 1; a data bus 3 for transferring data among different units of the apparatus; a ROM 4 for storing various programs and data, including a program for setting the number of wait states to be explained later, the ROM can be replaced by an equivalent device capable of storing programs and data; random-access memory 5 ("RAM" 5) used as a work area for the CPU 1; and interface circuit 6 composed ordinarily of a buffer circuit for an external memory; and an external memory 7 which can be a non-volatile memory such as a ROM or a non-volatile random-access memory ("NVRAM") where access is made by the CPU 1 through the external memory interface circuit 6.

A programmable wait state number control circuit 8 controls the number of wait states for accessing the external memory 7 by the CPU 1, according to the number of wait states designated in the program of the CPU 1. A wait state number control signal 9 is provided by the control circuit 8 to the CPU 1.

Figure 2:
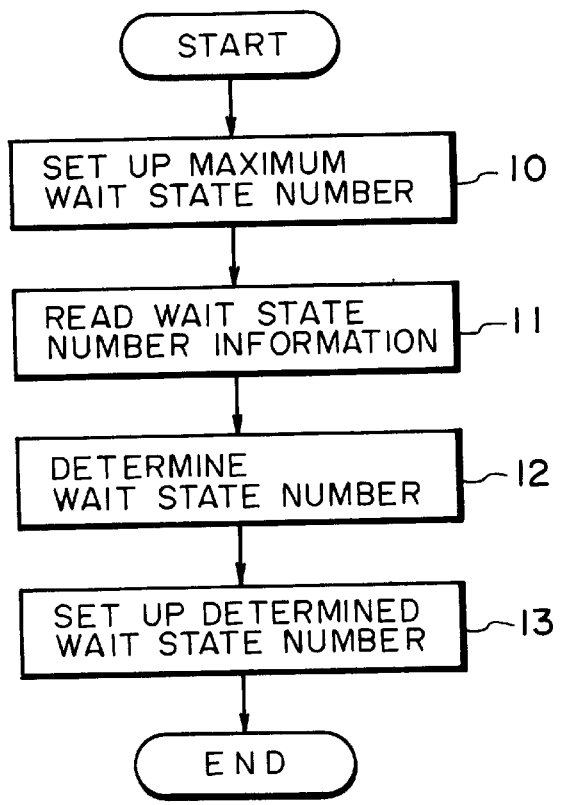
FIG. 2 is a flow chart of a process for setting the number of wait states.

FIG. 2 is a flow chart of a process for setting the number of wait states for access to the external memory.

Referring to FIG. 2, the following explains the sequence for setting the number of wait states for accessing the external memory 7. First, prior to accessing the external memory 7, step 10 sets the largest settable number of wait states in the programmable wait state number control circuit 8. Then, in step 11, the CPU 1 reads, through an external memory interface circuit 6, information on the number of wait states provided in advance by the external memory 7, such as a ROM or NVRAM. The information can be the number of wait states, or the access time of the external memory 7. Step 12 determines the number of wait states, based on the information from the number of wait states obtained in the step 11. The number is either obtained directly from the information, if the information represents the number of wait states, or calculated by the CPU 1 if the information indicates the access time of the external memory 7. Then step 13 sets the number of wait states, determined in the step 12, for the programmable control circuit 8.

Through the above-explained process, the number of wait states for accessing the external memory 7 by the CPU 1 through the interface circuit 6 is set in the programmable wait state number control circuit 8. Accordingly, access to the external memory 7 by the CPU 1 is thereafter made using this number of wait states.

The foregoing embodiment allows the CPU 1 to access the external memory 7 with the number of wait states derived from the access speed thereof, without hardware for controlling the number of wait states in the external memory.

In the foregoing embodiment, the external memory 7 is assumed to have only one number of wait states, but a plurality of memory means with different numbers of wait states may be present in the external memory 7. In such case, information on such different numbers of wait states are stored in advance by the memory means of the external memory 7, and step 11 in FIG. 2 reads the information respectively from the memory means of the external memory 7 and selects the largest number of wait states among the information obtained. Accordingly, access to the external memory 7 is made with the number of wait state matching the lowest access speed of the plurality of memory means present in the external memory 7.

As explained in the foregoing, the present invention obtains information on the number of wait states for accessing an interchangeable external memory by a CPU and controls the number of wait states for accessing external memory according to the information obtained. This allows access to the external memory where the number of wait states matches the access speed of the external memory, and performs this without extra hardware in the external memory for controlling the number of wait states.

What is claimed is:

1. An information processing apparatus for accessing a detachable external memory means based on a number of wait states for access comprising:

first setting means for setting the number of wait states for first access to said detachable external memory means at a maximum value;

reading means for accessing said detachable external memory means, said reading means performing a first access to said detachable external memory means based on the number of wait states for first access set by said first setting means and for reading access time information from said detachable external memory means;

second setting means for setting the number of wait states for second access to said detachable external memory means based on the access time information read by said reading means; and control means for controlling second access to said detachable external memory means by said reading means based on the number of wait states for second access set by said second setting means.

2. In an information processing apparatus for accessing a detachable external memory means, a method of accessing the detachable external memory means comprising the steps of:

performing a first access of the detachable external memory means based on a largest number of wait states for first access;

reading, during said first access, access time information from the detachable external memory means;

setting the number of wait states for second access from the access time information read in said reading step; and accessing the detachable external memory means based on the number of wait states for second access set by said setting step.

3. An information processing apparatus for accessing a detachable external memory means based on a number of wait states for access comprising:

setting means for setting a number of wait states for first access to said detachable external memory means at a maximum value;

reading means for accessing said detachable external memory means, said reading means performing a first access to said detachable external memory means based on the number of wait states for first access set by said setting means and for reading the number of wait states for second access from said detachable external memory means; and control means for setting the number of the wait states for second access by said reading means and controlling second access to said detachable external memory means by said reading means based on the number of wait states for second access read by said reading means.

4. In an information processing apparatus for accessing a detachable external memory means based on a number of wait states for access, a method of accessing the detachable external memory means comprising the steps of:

performing a first access of the detachable external memory means based on a largest number of wait states for first access;

reading, during said first access, the number of wait states for second access; and accessing the detachable external memory means based on the number of wait states for second access read in said reading step.

5. An information processing apparatus for accessing a detachable external memory means based on a number of wait states for access comprising:

setting means for setting a number of wait states for first access to said detachable external memory means at a maximum value;

reading means for accessing said detachable external memory means, said reading means performing a first access to said detachable external memory means based on the number of wait states for first access set by said setting means and for reading information on the number of wait states for second access from said detachable external memory means;

determining means for determining the number of wait states for second access based on the information on the number of wait states for second access read by said reading means; and control means for setting the number of the wait states for second access by said reading means and controlling second access to said detachable external memory means by said reading means based on the number of wait states for second access determined by said determining means.

6. An information processing apparatus according to claim 5, wherein the information on the number of wait states for second access used by said determining means is the number of wait states for second access.

7. An information processing apparatus according to claim 5, wherein the information on the number of wait states for access used by said determining means is the access time of said external memory means.

8. A method of accessing a detachable external memory means in an information processing apparatus based on a number of wait states for access comprising the steps of:

performing a first access of said detachable external memory means based on a largest number of wait states for first access;

reading, during said first access, information on the number of wait states for second access;

setting the number of wait states for second access based on the information read in said reading step; and accessing said detachable external memory means based on the number of wait states for second access set by said setting step.

9. A method according to claim 8, wherein the information on the number of wait states for second access used by said determining step is the number of wait states for second access.

10. A method according to claim 8, wherein the information on the number of wait states for second access used in said determining step is the access time of said detachable external memory means.

11. An information processing apparatus for accessing a detachable memory based on a number of predetermined wait states for access comprising:

reading means for reading a number of wait states peculiar to each memory from detachable first memory and detachable second memory;

setting means for setting a number of wait states for access read from among the number of wait states read from said first memory and said second memory by said reading means at a maximum value; and control means for controlling access to said first memory and said second memory based on the number of wait states set by said setting means.

12. An apparatus according to claim 11, wherein said reading means reads a number of wait states peculiar to each of said first memory and said second memory from said first memory and said second memory at a maximum value.

13. An apparatus according to claim 11, wherein said reading means reads access time information peculiar to each of said first memory and said second memory from said first memory and said second memory and determines a number of wait states for access based on the access time information read by said reading means.

14. An apparatus according to claim 11, wherein said information processing apparatus is a controller for controlling a printer.

15. An apparatus according to claim 14, wherein said information processing apparatus comprises a printer.

* * * * *